W. H. DAWLEY.
OIL CUP.
APPLICATION FILED JULY 23, 1912.
1,071,400.
Patented Aug. 26, 1913.
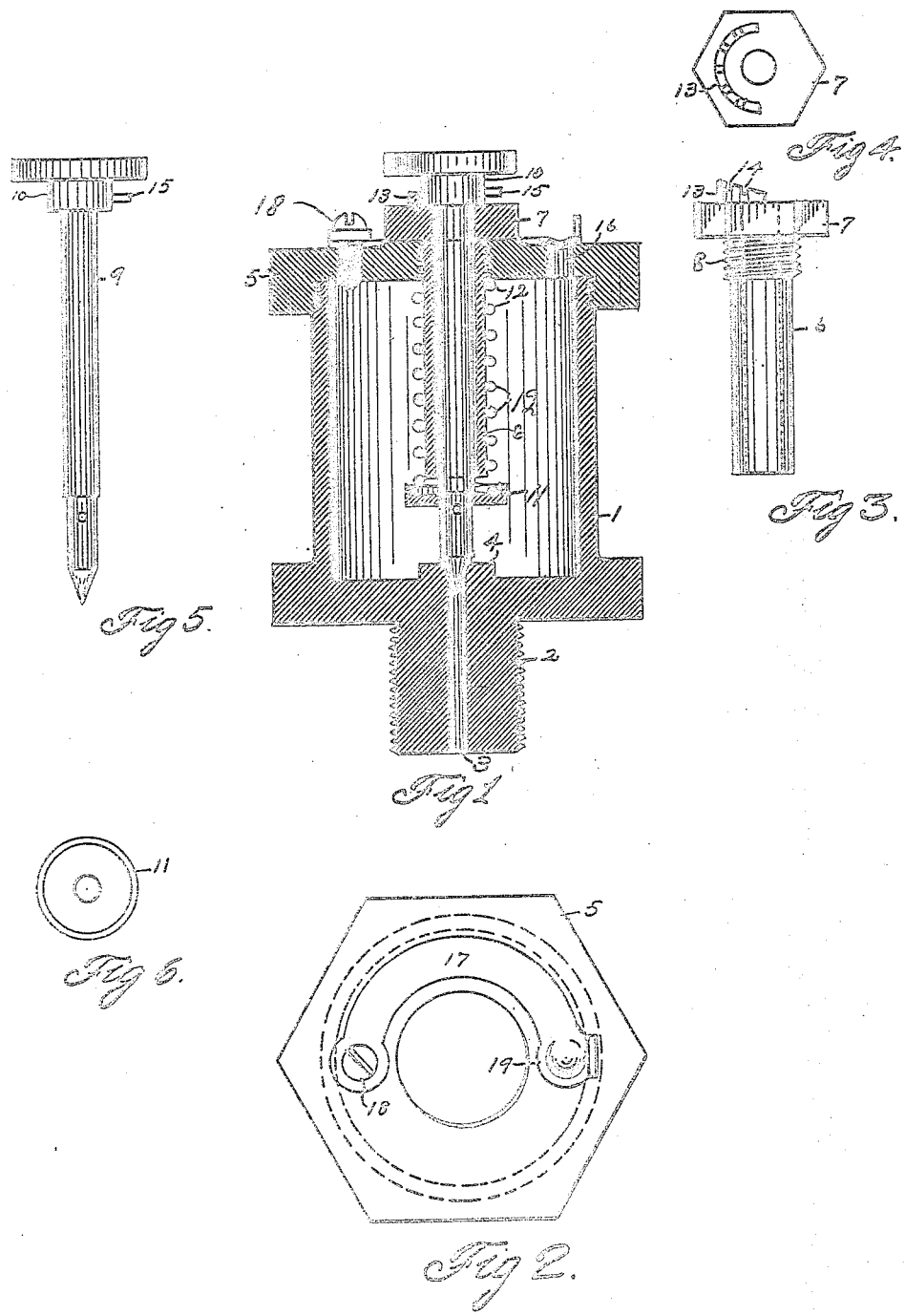

UNITED STATES PATENT OFFICE.

WILLIAM H. DAWLEY, OF HOUSTON, TEXAS.

OIL-CUP.

1,071,400. Specification of Letters Patent. Patented Aug. 26, 1913.

Application filed July 23, 1912. Serial No. 711,044.

*To all whom it may concern:*

Be it known that I, WILLIAM H. DAWLEY, a citizen of the United States, residing at Houston, in the county of Harris and State of Texas, have invented certain new and useful Improvements in Oil-Cups, of which the following is a specification.

My invention relates to new and useful improvements in oil cups.

The object of the invention is to provide a device of the character described for the purpose of lubricating bearings and arranged to be readily secured to and detached from the bearing to be lubricated and the specific improvement embodied in this invention consists of a means for positively regulating the valve which controls the flow of the lubricant from the oil cup into the bearing whereby the valve may be set for any desired feed of oil to the bearing and will remain in the desired position until positively changed. The set of the valve is thus made uniform and the valve is held firmly against movement caused by the jar or vibration of the machinery to which the cup is attached.

With the above and other objects in view, the invention has particular relation to certain novel features of construction, operation and arrangement of parts, an example of which is given in this specification and illustrated in the accompanying drawings, wherein—

Figure 1 is a sectional side elevation of the cup. Fig. 2 is a plan view thereof. Fig. 3 is a side elevation of the valve supporting sleeve. Fig. 4 is a plan view of the head of said sleeve. Fig. 5 is a side elevation of the valve, and Fig. 6 is a plan view of the disk carried by the valve.

Referring now more particularly to the drawings, the numeral 1 refers to the oil cup which is of the usual and well known construction and which has depending from the bottom thereof, the outwardly threaded neck 2 which is integral therewith and which is provided to be screwed into a suitable tapped hole in the bearing to be lubricated. Extending axially through this neck and through the bottom of the cup 1 is a passageway 3, provided for the purpose of conducting the lubricant from the cup to the bearing to be lubricated. The upper end of this passageway is flared and a valve seat 4 is formed at the center of the bottom of the cup and surrounds said flared portion. A cap 5 is provided which is adapted to be screwed over the upper end of the cup for the purpose of inclosing the same and retaining the lubricant therein. This cap has a centrally located tapped hole and through this hole a sleeve 6 projects down into the cup. The sleeve has an enlarged head 7 which rests upon the cap and immediately underneath said head is a threaded portion 8 which threads into the central orifice of the cap and secures the sleeve in position, the lower portion of this sleeve being somewhat reduced, so as to readily pass through said orifice.

Projecting through the sleeve 6 is the valve 9 which is an oblong member whose lower end is tapered and fits into the flared upper end of the passageway 3 and controls the same. The upper end of this valve is enlarged into a head 10 which rests against the upper side of the head 7 of the sleeve 6.

Secured to the valve 9 near its lower end by means of a pin or any other suitable means, is the disk 11 and interposed between this disk and the cap 5 is a strong coil spring 12 which operates in resistance to said cap and disk and tends to hold the reduced lower end of the valve firmly seated in the seat 4. The upper face of the head 7 is provided with an arcuate rack member 13 which is integral with said head and which partially surrounds the head 10 of the valve 9. The upper edge of this rack member gradually declines each way from a central point and said edge is provided with a plurality of notches 14 arranged at regular intervals apart and projecting from the side of the head 10 is a lug 15, provided to rest in one of said notches.

It is obvious that the head 10 of the valve 9 may be caught by the hand of the operator and by a pull thereon the resistance of the spring 12 may be overcome and the valve may be unseated and turned in either direction and the lug 15 seated in either of the notches 14 and it is further obvious that when said lug is seated in any given notch, the valve will be held at a certain point of elevation until said valve is changed by the positive action of the operator. When it is desired to further limit the flow of the lubricant, the valve is partially turned and the lug 15 allowed to seat on one of the lower notches, but in case it is desired to increase the flow of lubricant, the valve will be so turned as to seat the lug 15 in one of the notches higher up on the upper edge of the rack member 13. When it is desired to entirely shut off the flow of the lubricant, the valve may be turned until it does not engage with the rack member 13 at all, when the valve will fully seat in the upper end of the passageway 3 and entirely close the same.

The cap 5 is provided with an orifice 16 through which the lubricant may be admitted into the cup 1. In order to provide a closure for said orifice, I have constructed a flat spring, arcuate in shape, one end of which is pivoted to the cap at the point 18 and the other end of which carries a disk-like closure 19. This spring is of sufficient resiliency to hold the closure firmly over the orifice 16 and when it is desired to open the orifice for the introduction of the lubricant, the same may be withdrawn, turning upon the pivotal support 18.

It is obvious that the valve controlling the passage of the lubricant from the cup when fixed in a position, will be firmly held in that position, irrespective of the amount of shock or jar to which the cup may be subjected and a uniform feed of oil will thus be maintained which is varied only at the will of the operator.

What I claim is:—

1. A device of the character described consisting of a suitable cup having a threaded neck depending from the bottom thereof, by means of which the same is secured to a bearing to be lubricated, the bottom of said cup being provided with a passageway which leads from the interior thereof through said neck, a cap for said cup, a sleeve secured to said cap and depending into the cup, a valve extending through said sleeve and whose free end projects into said passageway, a resilient member surrounding said sleeve and operating in resistance to said valve and cap and normally holding the free end of said valve in said passageway, a rack member carried by the upper end of said sleeve whose upper face is inclined and provided with notches, a lug projecting laterally from said valve and adapted to rest in either of said notches whereby said valve may be adjusted relative to said cap and passageway.

2. A device of the character described, consisting of a cup having a threaded neck depending from the bottom thereof by means of which the same is secured to the bearing to be lubricated, the bottom of said cup being provided with a passageway which leads from the interior thereof through the said neck, a cap screwed to the upper end of said cup, a sleeve having an enlarged head at its upper end, which rests upon said cap, and a threaded portion immediately beneath the said head, which engages in an inwardly threaded orifice in the cap, said sleeve depending down through the cup, and being alined with the passage-way in the bottom thereof, a valve extending through said sleeve, and whose lower end is tapered and projects into said passage-way, a resilient member surrounding said sleeve and operating in resistance to said valve and cap and normally holding the free end of valve in said passage-way, a rack member carried by the upper side of the head of said depending sleeve whose upper face is inclined and provided with notches, a lug projecting laterally from said valve, and adapted to rest in either of the said notches, whereby said valve may be adjusted relative to said cap and passage-way.

3. A device of the character described, consisting of a cup having a threaded neck depending from the bottom thereof by means of which the same is secured to the bearing to be lubricated, the bottom of said cup being provided with a passage-way which leads from the interior thereof through the said neck, a cap screwed to the upper end of said cup, a sleeve having an enlarged head at its upper end, which rests upon said cap, said sleeve being vertically adjusted relative to the cap and depending down through the cup, and being alined with the passage-way in the bottom thereof, a valve extending through said sleeve, and whose lower end is tapered and projects into said passage-way, a resilient member surrounding said sleeve, and operating in resistance to said valve and cap and normally holding the free end of said valve in said passage-way, a rack member carried by the upper side of the head of said depending sleeve whose upper face is inclined and provided with notches, a lug projecting laterally from said valve, and adapted to rest in either of the said notches, whereby said valve may be adjusted relative to said cap and passage-way.

In testimony whereof I have signed my name to this specification in the presence of two subscribing witnesses.

WILLIAM H. DAWLEY.

Witnesses:
E. C. REICHARD,
E. L. CATHEY.